(12) United States Patent
Cao et al.

(10) Patent No.: US 10,310,175 B2
(45) Date of Patent: Jun. 4, 2019

(54) DISPLAY DEVICE

(71) Applicant: BOE TECHNOLOGY GROUP CO., LTD., Beijing (CN)

(72) Inventors: Lei Cao, Beijing (CN); Zifeng Wang, Beijing (CN); Yan Ren, Beijing (CN); Hailan Jin, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/795,243

(22) Filed: Oct. 26, 2017

(65) Prior Publication Data

US 2018/0284342 A1 Oct. 4, 2018

(30) Foreign Application Priority Data

Mar. 28, 2017 (CN) .................... 2017 2 0313613 U

(51) Int. Cl.
*F21V 8/00* (2006.01)
*G02F 1/133* (2006.01)
*G02F 1/1333* (2006.01)

(52) U.S. Cl.
CPC ......... *G02B 6/0095* (2013.01); *G02B 6/0068* (2013.01); *G02F 1/13306* (2013.01); *G02F 1/133308* (2013.01); *G02F 1/133365* (2013.01); *G02F 2001/133311* (2013.01); *G02F 2201/121* (2013.01); *G02F 2201/123* (2013.01)

(58) Field of Classification Search
CPC ......... G02F 1/133308; G02F 1/133365; G02F 1/13306; G02B 6/0095; G02B 6/0075; G02B 6/0068
See application file for complete search history.

(56) References Cited

U.S. PATENT DOCUMENTS

| | | | | |
|---|---|---|---|---|
| 5,875,013 A | * | 2/1999 | Hiroshi | G02F 1/1335 349/110 |
| 7,147,333 B2 | * | 12/2006 | Shirota | G02B 7/1805 353/81 |
| 8,690,414 B2 | * | 4/2014 | Tomotoshi | G02F 1/13336 362/616 |
| 2002/0126086 A1 | * | 9/2002 | Takeuchi | G09F 9/305 345/156 |
| 2004/0114249 A1 | * | 6/2004 | Nishihara | H04N 9/3105 359/617 |
| 2005/0017921 A1 | * | 1/2005 | Okude | G06F 3/1431 345/1.1 |
| 2014/0285400 A1 | * | 9/2014 | Sato | G06F 3/1446 345/1.3 |
| 2015/0131022 A1 | * | 5/2015 | Zhang | G02B 6/0075 349/58 |
| 2018/0150274 A1 | * | 5/2018 | Shin | G02F 1/13454 |

* cited by examiner

*Primary Examiner* — Jia X Pan
(74) *Attorney, Agent, or Firm* — Kinney & Lange, P.A.

(57) ABSTRACT

A display device is disclosed. The display device includes: a plurality of side portions, each side portion comprising a transparent display panel; and a light source disposed at a lateral side of the transparent display panel. The display device can be used to display pictures towards a plurality of directions, and can be used to exhibit an article.

15 Claims, 4 Drawing Sheets

DISPLAY DEVICE

CROSS-REFERENCE TO RELATED APPLICATION

This application claims the benefits of Chinese Patent Application No. 201720313613.X filed on Mar. 28, 2017 in the State Intellectual Property Office of China, a whole disclosure of which is incorporated herein by reference.

TECHNICAL FIELD

The present disclosure relates to the field of display technology, and particularly, to a display device including a plurality of displaying sides each having a display function.

BACKGROUND

Liquid crystal display usually includes an upper substrate, a lower substrate, a liquid crystal layer located between the upper substrate and the lower substrate, a pixel electrode and a common electrode used to generate an electric field, an upper polarizer located at an outer side of the upper substrate, a lower polarizer located at an outer side of the lower substrate, and a backlight source.

With development of display technology, transparent display devices based on liquid crystal displays have been widely used. Therefore, the present disclosure aims to provide a new transparent display device.

SUMMARY

According to an aspect of the present disclosure, there is provided a display device.

In an exemplary embodiment, the display device may comprise: a plurality of side portions, each side portion comprising a transparent display panel; and a light source disposed at a lateral side of the transparent display panel.

In another exemplary embodiment, the display device may further comprise: a casing having an open end, the casing comprising the plurality of side portions; and a cover mounted to the open end of the casing.

In a further exemplary embodiment, the display device may further comprise: a control device configured to control the transparent display panel and the light source.

In a still further exemplary embodiment, the control device may be mounted to the cover.

In a still further exemplary embodiment, the light source may comprise at least one light bar disposed in the cover.

In a still further exemplary embodiment, the cover may be provided with a first groove at an edge portion thereof facing an upper end of a corresponding side portion of the plurality of side portions, and the at least one light bar is disposed within the first groove.

In a still further exemplary embodiment, an outer sidewall of the first groove may be provided thereon with a sealing component.

In a still further exemplary embodiment, the display device may further comprise: a casing having an open end, the casing comprising the plurality of side portions; and a base mounted to the open end of the casing.

In a still further exemplary embodiment, the control device may be mounted to the base.

In a still further exemplary embodiment, the light source may comprise at least one light bar disposed in the base.

In a still further exemplary embodiment, the base may be provided with a second groove at an edge portion thereof facing a lower end of a corresponding side portion of the plurality of side portions, and the at least one light bar is disposed within the second groove.

In a still further exemplary embodiment, an outer sidewall of the second groove may be provided thereon with a sealing component.

In a still further exemplary embodiment, the transparent display panel may comprise a liquid crystal polymer layer formed of a liquid crystal polymer.

In a still further exemplary embodiment, the liquid crystal polymer is formed of a mixture of liquid crystal molecules, polymerizable liquid crystal monomers and a photoinitiator under irradiation by ultraviolet light.

BRIEF DESCRIPTION OF THE DRAWINGS

The above and other features of the present disclosure will become more apparent by describing in detail exemplary embodiments thereof with reference to the accompanying drawings, in which.

DETAILED DESCRIPTION OF EMBODIMENTS

Figure 1:
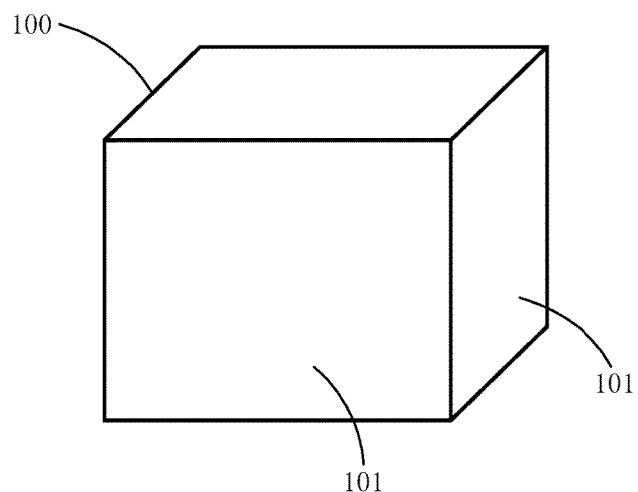
FIG. 1 is an illustrative drawing, showing a profile of a display device according to an exemplary embodiment of the present disclosure.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

Figure 2:
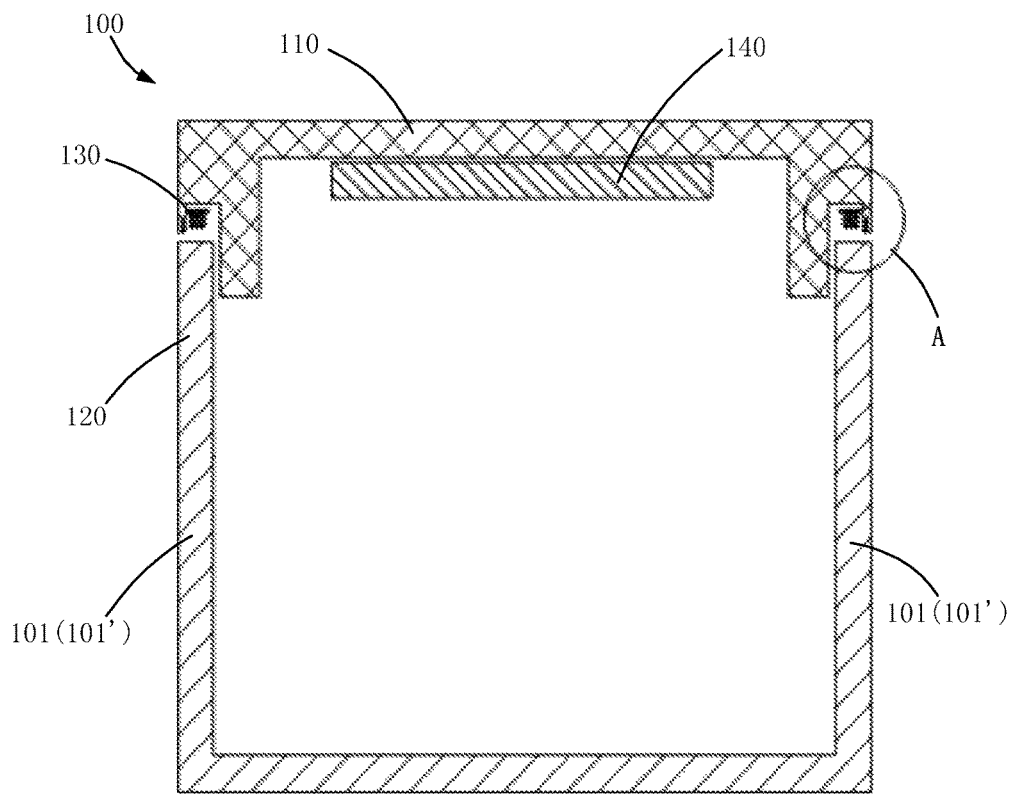
FIG. 2 is an illustrative cross-sectional view, showing a display device according to an embodiment of the present disclosure.

FIGS. 1 and 2 show a display device according to an exemplary embodiment of the present disclosure. As shown in FIG. 1, the display device 100 includes a plurality of side portions 101, each including a transparent display panel 101'. When the display device 100 is working, each transparent display panel provides a picture towards a corresponding direction. Additionally, the display device 100 further includes a light source 130 disposed at a lateral side of each transparent display panel respectively (FIG. 2), for providing backlight to a corresponding transparent display panel 101'.

FIG. 2 illustratively shows a cross section of the display device 100. As shown in FIG. 2, the display device 100 includes: a casing 120 having an open end, the casing including a plurality of the side portions 101; and a cover 110 mounted to the open end (i.e., upper end) of the casing 120. The light source 130 is configured to provide side entry backlight to an end surface of the transparent display panel 101'.

In an embodiment, the display device 100 further includes a control device 140, configured to control each of the transparent display panels 101' and the light source 130. The control device 140 may be disposed within the cover 110, or mounted to a lower or inner surface of the cover 110.

Figure 3:
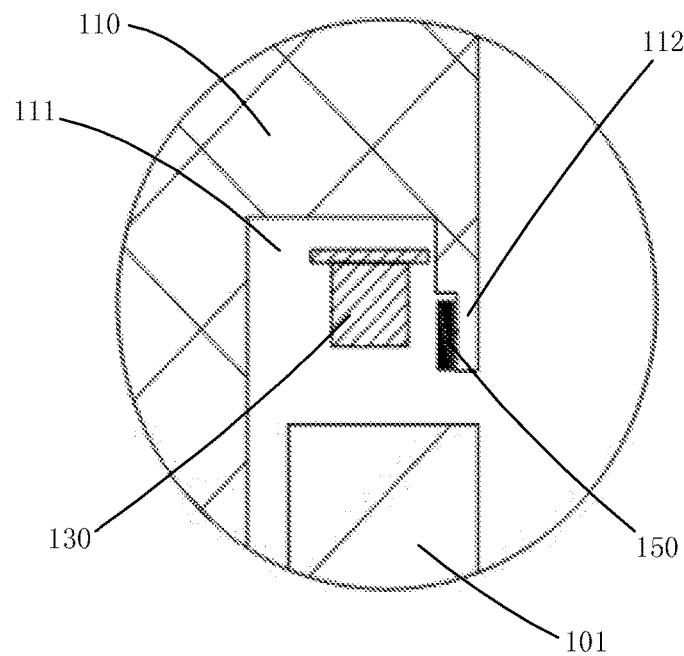
FIG. 3 is an illustrative partially enlarged view of portion A of FIG. 2.
Figure 5:
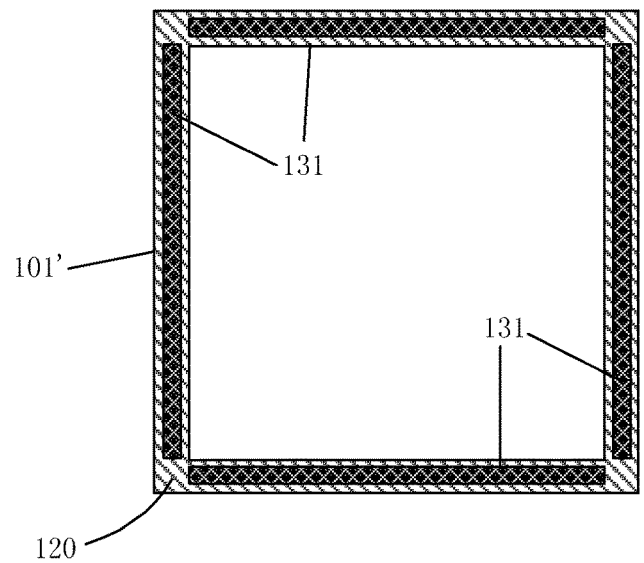
FIG. 5 is an illustrative drawing, showing an arrangement of light bars of a display device according to an exemplary embodiment of the present disclosure.

In an exemplary embodiment, the light source 130 includes a plurality of light bars 131 disposed on the cover (FIG. 5). FIG. 3 is a partially enlarged view of the portion A of FIG. 2, and a relative position relationship between the light bars 131 and the transparent display panels 101' can be determined from FIGS. 3 and 5.

In an exemplary embodiment, as shown in FIG. 3, the cover 110 is provided with a groove 111 at an edge portion thereof facing an upper end of the side portion 101, and the light bar 131 is disposed in the groove 111.

In order to prevent external contaminants from entering the groove 111, preferably, a sealing component 150 is provided on an outer sidewall 112 of the groove 111. The sealing component 150 may be a rubber pad or other suitable sealing structure, which may also prevent light emitted by light bar 131 from leaking out of a gap between the cover 110 and the casing 120 while providing a seal.

Figure 4:
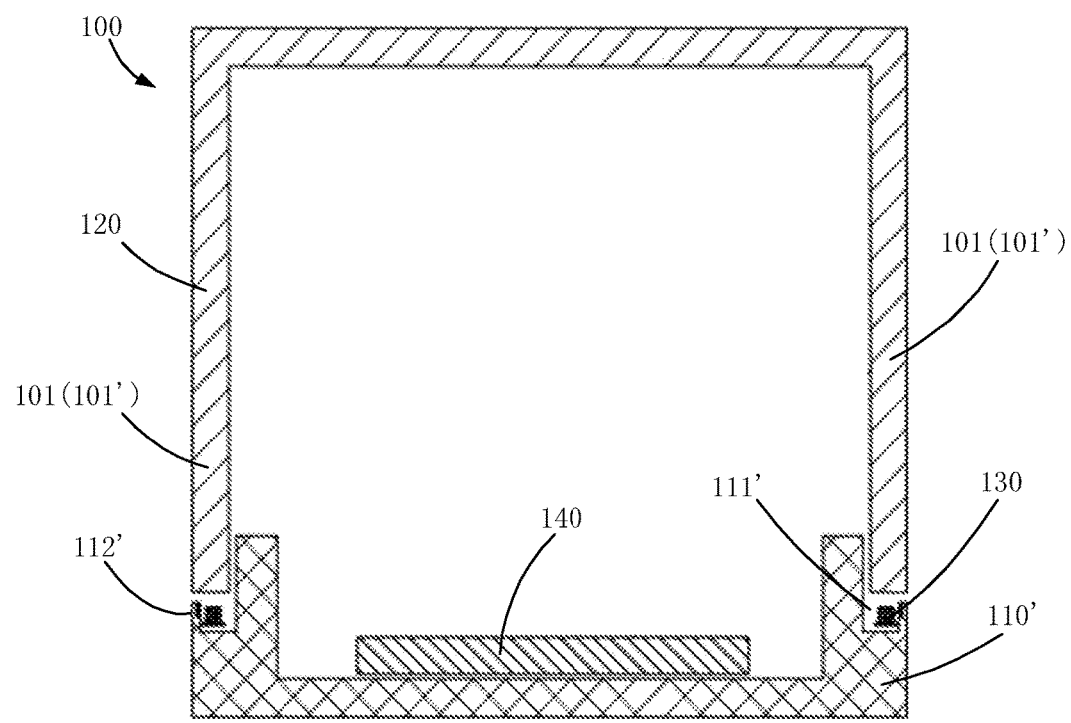
FIG. 4 is an illustrative cross-sectional view, showing a display device according to an alternative embodiment of the embodiment shown in FIG. 2.

FIG. 4 shows an embodiment alternative to that shown in FIG. 2. The structure of the display device shown in FIG. 4 is similar but inverted with respect to that shown in FIG. 2. As shown in FIG. 4, the display device 100 comprises: the casing 120 having an open end, the casing 120 comprising a plurality of the side portions 101; and a base 110' mounted to the open end (i.e., lower end) of the casing 120. The light source 130 is configured to provide a side entry backlight to an end surface of the transparent display panel 101'.

In the embodiment shown in FIG. 4, the control device 140 is configured to control each of the transparent display panels 101' and the light source 130. The control device 140 may be disposed within the base 110', or mounted to an upper or inner surface of the base 110'.

In the embodiment shown in FIG. 4, the base 110' is provided with a groove 111' at an edge portion thereof aligned with an lower end of the side portion 101, and the light bar 131 is disposed in the groove 111'.

In order to prevent external contaminants from entering the groove 111', preferably, the sealing component 150 is provided on an outer sidewall 112' of the groove 111'.

It can be understood by an ordinary skilled in the art that, in other embodiments, the display device may comprises a casing having an upper open end and a lower open end, a cover assembled to the upper open end of the casing and a base assembled to the lower open end of the casing, and each edge of the cover and the base is provided with a light bar providing side entry backlight to the transparent display panel of the casing. With this configuration, backlight for the transparent display panel of the casing could be more uniform, and thereby a better display effect could be provided.

Figure 6:
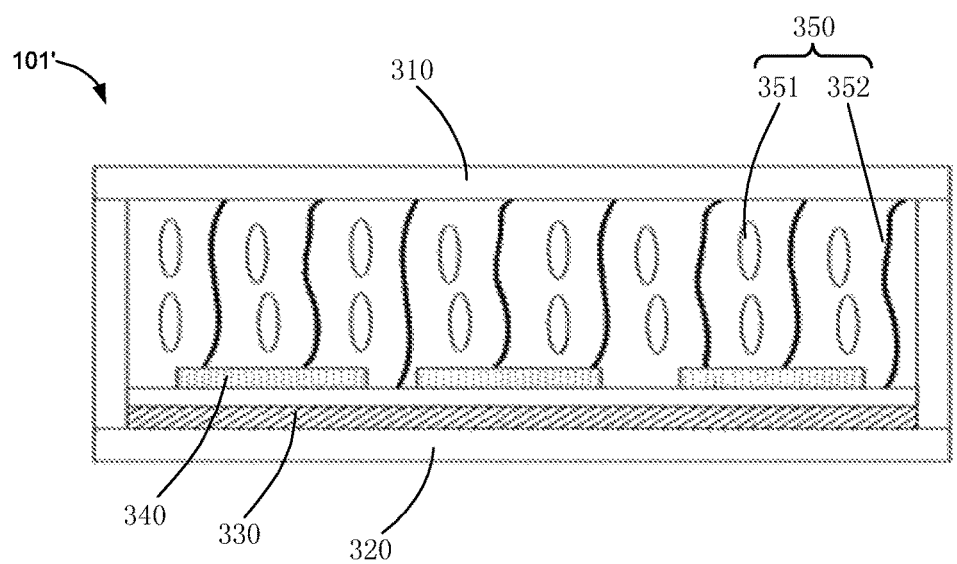
FIG. 6 is an illustrative view, showing a liquid crystal panel according to an exemplary embodiment of the present disclosure.

In an exemplary embodiment, as shown in FIG. 6, the transparent display panel 101' comprises: a first substrate 310 and a second substrate 320 that are disposed opposite to each other; a liquid crystal polymer layer 350 located between the first substrate 310 and the second substrate 320 and formed of a liquid crystal polymer; and a pixel electrode 330 and a common electrode 340 located between the first substrate 310 and the second substrate 320 and insulated from each other. The liquid crystal polymer may be formed of a mixture of liquid crystal molecules, polymerizable liquid crystal monomers and a photoinitiator after being irradiated by ultraviolet light.

After the mixture is irradiated by ultraviolet light, the polymerizable liquid crystal monomers will be polymerized to form long polymer chains 352. An extension direction of the long polymer chains 352 is substantially the same as a direction of the long axes of the liquid crystal molecules 351. Therefore, when the display panel is turned on, an electric field is generated by the pixel electrode 330 and the common electrode 340, and liquid crystal molecules 351 in the liquid crystal polymer layer 350 are deflected under the effect of the electric field, but the long polymer chains 352 are not easily to be deflected as they have formed a polymer network, such that the liquid crystal polymer layer 350 as a whole provides a light scattering function, and thus, at least a part of light emitted from the light source 3 comes out of one side of the first substrate 310 after being scattered by the liquid crystal polymer layer 350. When the display panel is turned off, the direction of long axes of the liquid crystal molecules 351 in the liquid crystal polymer layer 350 is the same as the extension direction of the long polymer chains 352 in the liquid crystal polymer layer 350, and the whole liquid crystal polymer layer 350 is transparent. By utilizing the display panel having such a structure, a commonly used light guide plate can be omitted, and the structure of the transparent display device may be simplified.

Figure 7:
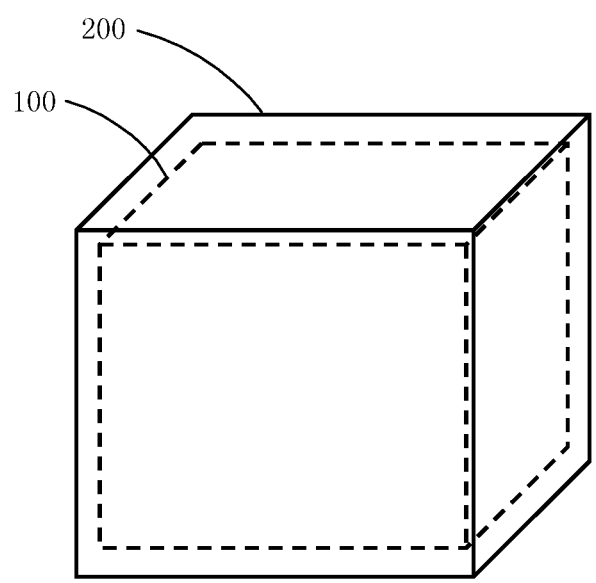
FIG. 7 is an illustrative drawing, showing a display device according to another embodiment of the present disclosure.

In an exemplary embodiment, the casing 120 may further comprises a frame and the transparent display panels mounted in the frame. In another exemplary embodiment, adjacent transparent display panels may be connected together by a transparent adhesive without using the frame. In a further exemplary embodiment, as shown in FIG. 7, the display device 100 may further be provided with a transparent housing 200, so as to provide protection to the display device 100.

Although the shape of the transparent casing shown in FIGS. 1, 5 and 6 of the present disclosure is a cuboid, it can be anticipated by those skilled in the art that the shape may be a cube, a cylinder, a regular polyhedron or the like.

Since the side portions 101 (i.e., the transparent display panels 101') of the display device of the present disclosure are transparent, the interior of the display device can be seen through sides of the display device. Therefore, an exhibit or ornamental article may be disposed in the interior space of the display device. In the case of an exhibit being disposed inside of the display device, the control device may be further configured to control the display panel to display information about the exhibit.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

What is claimed is:

1. A display device, comprising:
  a plurality of side portions, each of which comprises a transparent liquid crystal display panel configured to display an image thereon, and which surround an interior space configured to contain an exhibit or ornamental article visible from an outside of the interior space through the transparent liquid crystal display panels; and
  a plurality of light sources, each of which is disposed at a lateral side of one of the transparent liquid crystal display panels, and is located in a plane where the one of the transparent liquid crystal display panels is located and is configured to provide a backlight to the one of the transparent liquid crystal display panels.

2. The display device according to claim 1, wherein the display device further comprises:
   a casing having an open end, the casing comprising the plurality of side portions; and
   a cover mounted to the open end of the casing.

3. The display device according to claim 2, wherein the display device further comprises a control device configured to control the transparent liquid crystal display panels and the light sources.

4. The display device according to claim 3, wherein the control device is mounted to the cover.

5. The display device according to claim 2, wherein each of the light sources comprises at least one light bar disposed in the cover.

6. The display device according to claim 5, wherein the cover is provided with a first groove at an edge portion thereof facing an upper end of a corresponding side portion of the plurality of side portions, and the at least one light bar is disposed within the first groove.

7. The display device according to claim 6, wherein an outer sidewall of the first groove is provided thereon with a sealing component.

8. The display device according to claim 1, wherein the display device further comprises:
   a casing having an open end, the casing comprising the plurality of side portions; and
   a base mounted to the open end of the casing.

9. The display device according to claim 8, wherein the display device further comprises a control device configured to control the transparent liquid crystal display panels and the light sources.

10. The display device according to claim 9, wherein the control device is mounted to the base.

11. The display device according to claim 8, wherein each of the light sources comprises at least one light bar disposed in the base.

12. The display device according to claim 11, wherein the base is provided with a second groove at an edge portion thereof facing a lower end of a corresponding side portion of the plurality of side portions, and the at least one light bar is disposed within the second groove.

13. The display device according to claim 12, wherein an outer sidewall of the second groove is provided thereon with a sealing component.

14. The display device according to claim 1, wherein the transparent liquid crystal display panels comprise a liquid crystal polymer layer formed of a liquid crystal polymer.

15. The display device according to claim 14, wherein the liquid crystal polymer is formed of a mixture of liquid crystal molecules, polymerizable liquid crystal monomers and a photoinitiator under irradiation by ultraviolet light.

* * * * *